(12) United States Patent
Trantham

(10) Patent No.: US 6,962,174 B1
(45) Date of Patent: Nov. 8, 2005

(54) DUST FREE OIL SAVER

(76) Inventor: Charles Trantham, 1787 High Miller Rd., Lexington, NC (US) 27292

( * ) Notice: Subject to any disclaimer, the term of this patent is extended or adjusted under 35 U.S.C. 154(b) by 0 days.

(21) Appl. No.: 10/678,620

(22) Filed: Oct. 3, 2003

(51) Int. Cl.[7] .............................................. B65B 39/06
(52) U.S. Cl. .......................... 141/9; 141/106; 141/332
(58) Field of Search ........................... 141/9, 105, 106, 141/286, 319, 332, 364, 375, 379

(56) References Cited

U.S. PATENT DOCUMENTS

| | | | |
|---|---|---|---|
| 4,207,933 A * | 6/1980 | Howson | 141/106 |
| 4,832,095 A | 5/1989 | Bonnell | 141/106 |
| 4,930,602 A | 6/1990 | Gust | 184/106 |
| 5,067,530 A | 11/1991 | Short, III | 141/98 |
| D341,150 S | 11/1993 | Seegmiller | D15/150 |
| 5,269,354 A * | 12/1993 | Koberg | 141/106 |
| 5,325,898 A | 7/1994 | Forgnone | 141/106 |
| 5,360,039 A | 11/1994 | Verilli | 141/98 |
| 5,381,839 A | 1/1995 | Dowd | 141/242 |
| 5,522,437 A * | 6/1996 | Blackburn | 141/106 |
| 5,540,264 A * | 7/1996 | Harp | 141/106 |
| 5,967,203 A | 10/1999 | Culver, III | 141/106 |
| 6,085,806 A | 7/2000 | Davis et al. | 141/98 |

* cited by examiner

*Primary Examiner*—Justine R. Yu
*Assistant Examiner*—Peter deVore
(74) *Attorney, Agent, or Firm*—MacCord Mason PLLC

(57) ABSTRACT

The invention discloses an assembly for collecting residual motor oil from standard plastic motor oil containers comprising a housing with two inlets sized, configured and positioned for receiving plastic motor oil containers. An outlet at the bottom of the housing adapted to be placed within a residual oil collection unit substantially closes the collection unit, permitting collection of contaminant-free residual oil. The assembly further includes a base welded to the housing with support arms for the plastic motor oil containers. Multiple assemblies may be stacked to provide the ability to collect oil from additional motor oil containers.

1 Claim, 5 Drawing Sheets

DUST FREE OIL SAVER

BACKGROUND OF THE INVENTION

This invention generally relates to the field of residual new motor oil collection. More specifically, this invention relates to collecting residual motor oil from plastic motor oil containers and saving the residual motor oil in a collection unit.

After a person dispenses the contents of plastic motor oil container in which motor oil is commonly sold, a small quantity of the oil clings to the interior walls of the plastic container. This small amount of oil is usually thrown away with the container because several minutes of draining are required to remove the residue. Because of environmental concern, there exists a need to reclaim the residual oil and not throw the containers into a waste collection device. Many landfills have requirements which preclude the dumping of containers containing motor oil. The prior art reflects several devices for the collection of used motor oil and a few devices for the collection of unused residual motor oil. A significant limitation of the prior art devices for the collection of unused residual motor oil is that the devices are not closed. Consequently, these collection devices allow dust, bugs and other contaminants to enter the oil during the collection process, thereby leaving foreign substances in the oil collected. It is therefore important to have a residual oil collection system which prevents dust and other contaminants from contaminating the residual oil during the collection process; enabling the collected oil to be used as new. It is also important that the plastic containers, once drained of all the oil, may be discarded to a landfill without special handling.

SUMMARY OF THE INVENTION

The present invention fulfills one or more of these needs by providing a residual oil collection system which is closed. This prevents dust or other contaminants from coming in contact with the collected residual oil. Preferred embodiments also permit the drained plastic containers to be placed in a landfill without special handling.

The assembly for collecting residual motor oil from plastic motor oil containers includes a housing with two inlets sized, configured and positioned for receiving plastic motor oil containers so that the containers substantially close the inlets once in place. An outlet at the bottom of the housing is adapted to be placed within a residual oil collection unit and substantially close the oil collection unit. A base provides support to the housing and the plastic motor oil containers. The housing may be constructed of molded plastic, and the inlets typically include drainage shafts. The drainage shafts may have interior tapers which narrow from the inlet opening downwardly into the inlet shaft. The housing includes a main drainage shaft which has a removable cap at the top of the main drainage shaft and terminates at the outlet. The main drainage shaft has a taper at the outlet of the shaft. This taper is the smallest at the outlet of the main drainage shaft. The inlet drainage shafts are typically connected to the main drainage shaft at an angle. This angle is preferably greater than 45°.

The assembly also includes a base which is constructed of a rigid material. This rigid material may be plastic. The base preferably includes support arms to hold two plastic motor oil containers in place with their outlets within the inlet discharge shaft. The support arms may be constructed of metal or plastic and are affixed to the support base. The support arms may be straight or L-shaped. The support base typically also includes mounting slots.

The housing may be welded to the base. After the plastic motor oil containers are put in place within the inlets, and the removable cap is placed on the top of the main drainage shaft, the assembly is substantially closed.

Removal of the cap on the main drainage shaft permits attachment of additional housing assembly units, providing the ability to drain two additional motor oil containers per additional housing unit added. Multiple housing assembly units may be stacked in similar fashion. Once the plastic motor oil containers are in place, the taper at the bottom of the main discharge shaft into the collection unit, closes the assembly. When the plastic motor oil containers are in place, the residual oil drains from the plastic motor oil containers by the force of gravity. The substantially closed system permits dust and contaminant free collection of the residual oil contained in the plastic motor oil containers.

DETAILED DESCRIPTION OF THE PREFERRED EMBODIMENT

Figure 1:
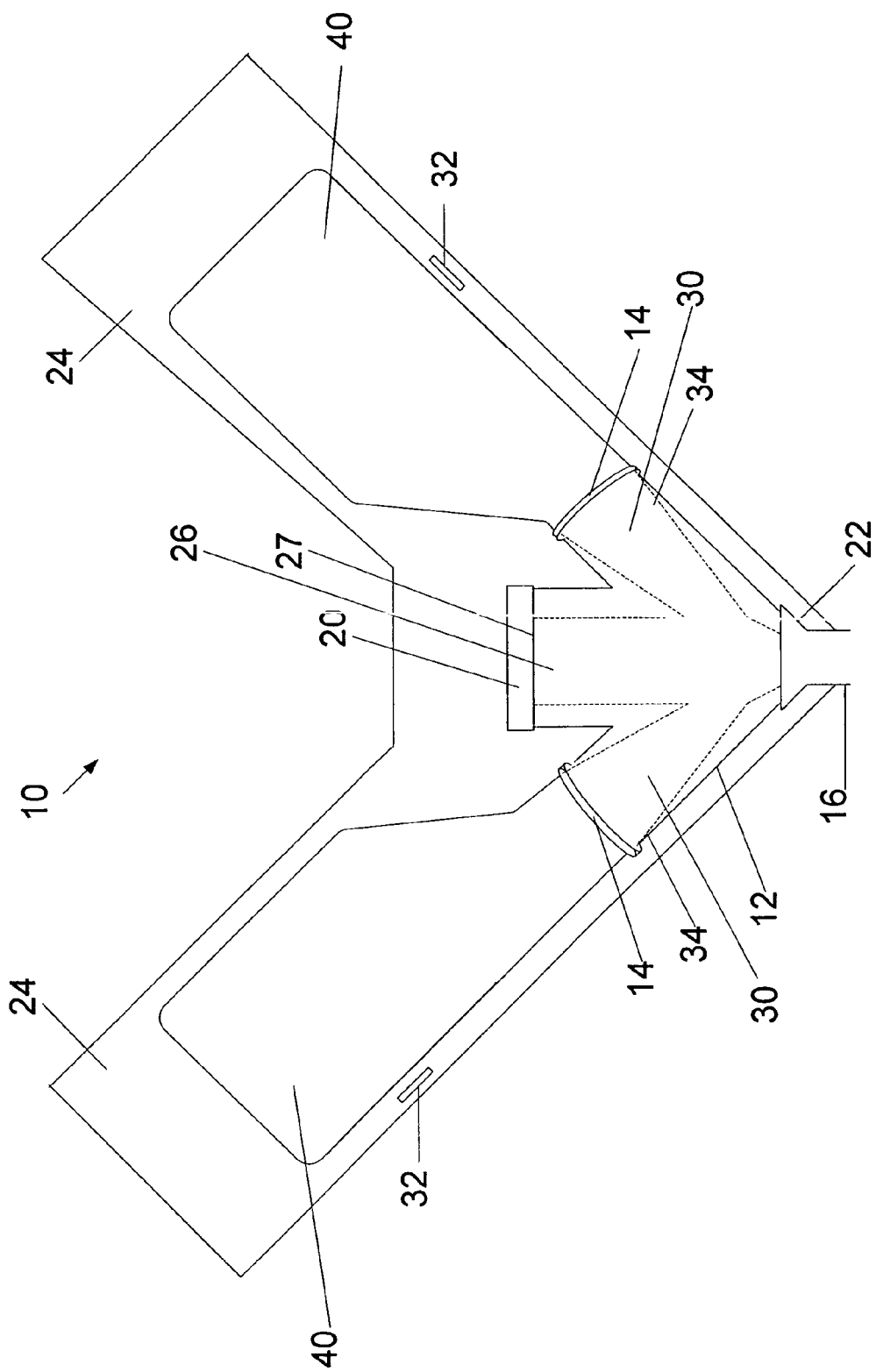
FIG. 1 is an elevational view of the preferred embodiment with oil bottles in place with portions of interior structures shown dashed lines.

In the following description, like reference characters designate like or corresponding parts throughout the several views. It is to be understood that illustrations are for the purpose of describing preferred embodiments of the invention and are not intended to limit the invention thereto.

As best seen in FIGS. 1, 2, 3 and 4, the assembly 10 for collecting residual motor oil from plastic motor oil containers 40 includes a housing 12, and a base support unit 24. The housing 12 is preferably constructed of injection molded plastic and has inlets 14 sized and shaped to receive the spouts of the standard motor oil containers 40 such that the spout substatantially closes the inlet when in place, preventing dust or contaminants from entering. The inlets 14 connect to drainage shafts 30. These drainage shafts 30 further include inlet tapers 34 that provide a snug fit on the spout of an oil container 40. The tapers 34 narrow from the inlet opening downwardly into the inlet drainage shaft 30. The housing 12 further includes a main drainage shaft 26 ending in an upwardly facing opening 27.

Figure 5:
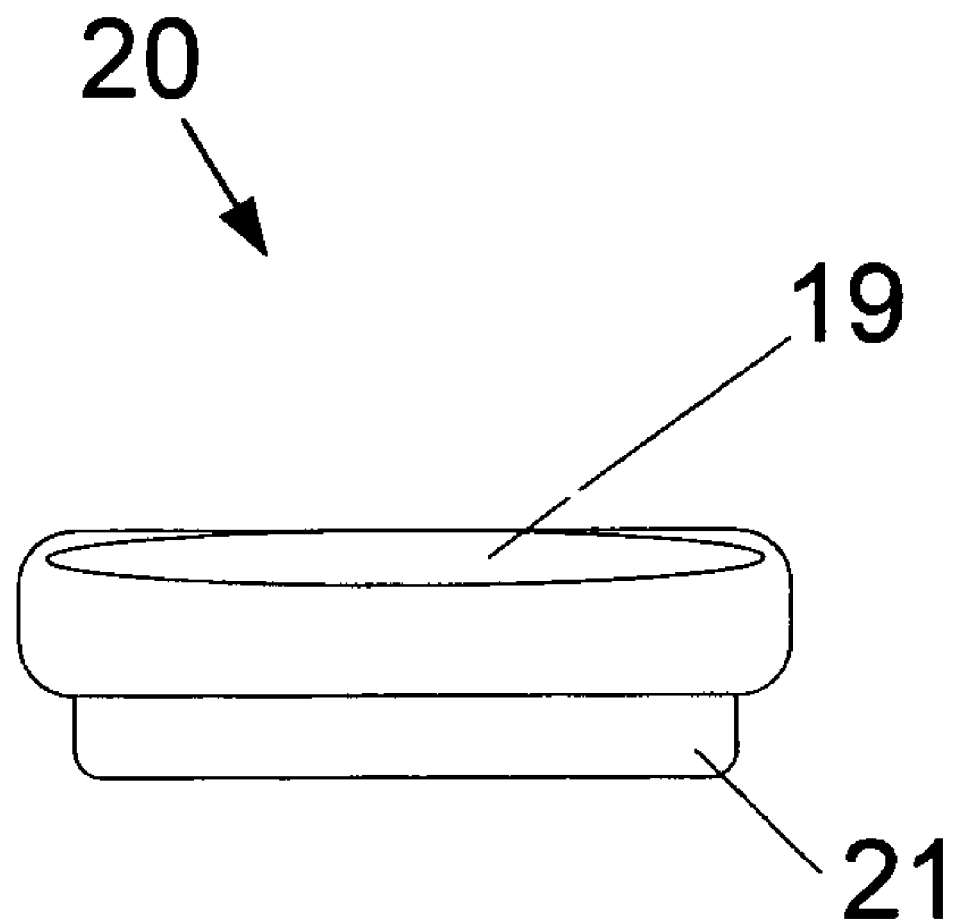
FIG. 5 is a perspective view of the cap.

The main drainage shaft 26 has a removable cap 20 which fits at the top of the main drainage shaft 26. As seen in FIG. 5, the removable cap 20 further includes a cap lid 19 and a cap plug 21. The cap plug 21 has a diameter which is sized to fit within the opening 27 of the top of the main drainage shaft 26 providing a snug fit. The cap lid 19 is sized to cover the outside diameter of the main drainage shaft. The removable cap 20 is pushed into the opening of the main drainage shaft 26 providing a snug fit so that contaminants are excluded. The main drainage shaft 26 also has an outer taper 22 at its bottom. The inlet drainage shafts 30 are connected to and open in the main drainage shaft 26. The inlet drainage shafts 30 are connected to the main drainage shaft 26 at an angle that is typically acute and greater than 45°. The housing 12 can be fabricated from conventional plumbing fittings.

Figure 2:
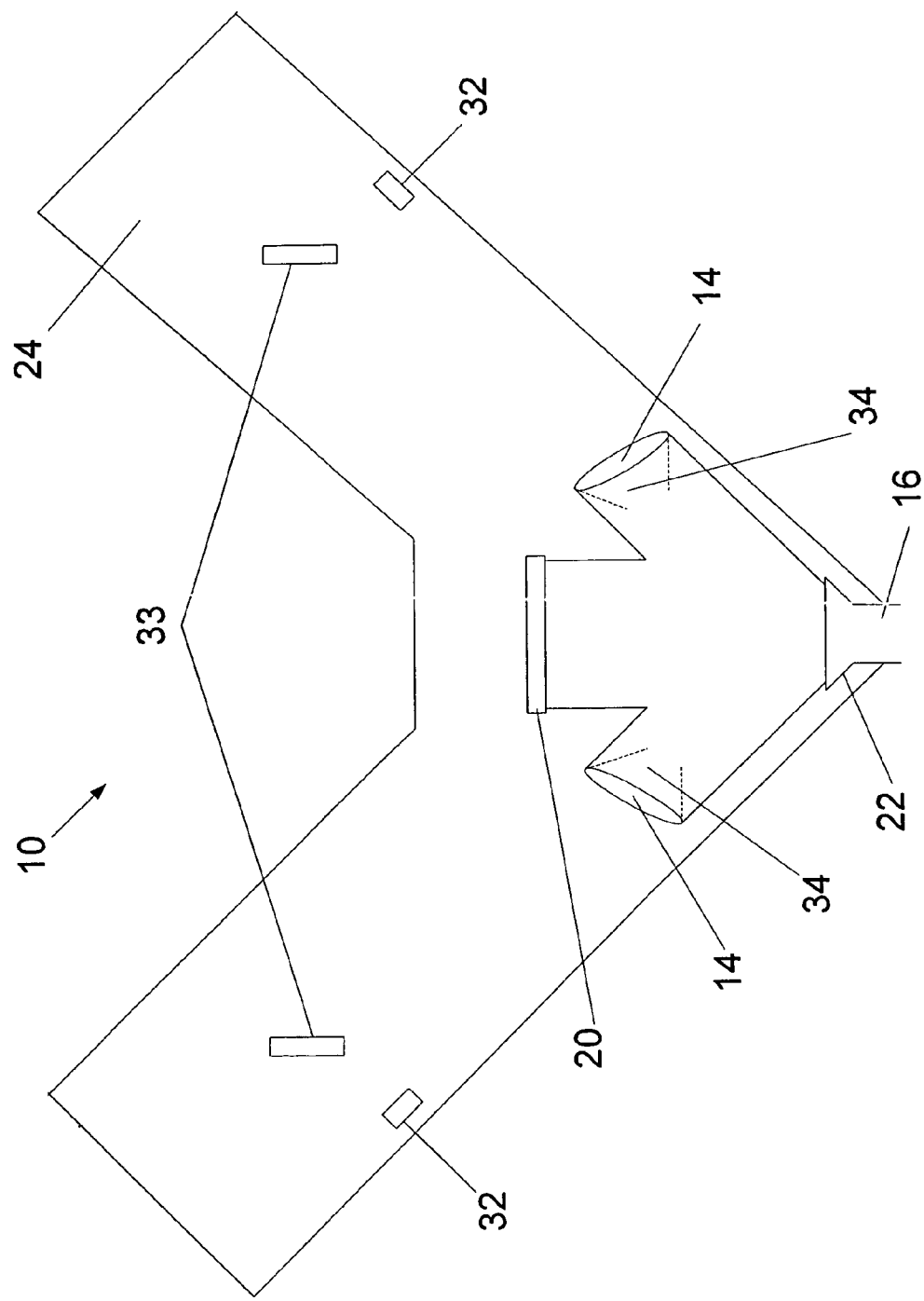
FIG. 2 is a schematic representation of the support base and housing unit.
Figure 3:
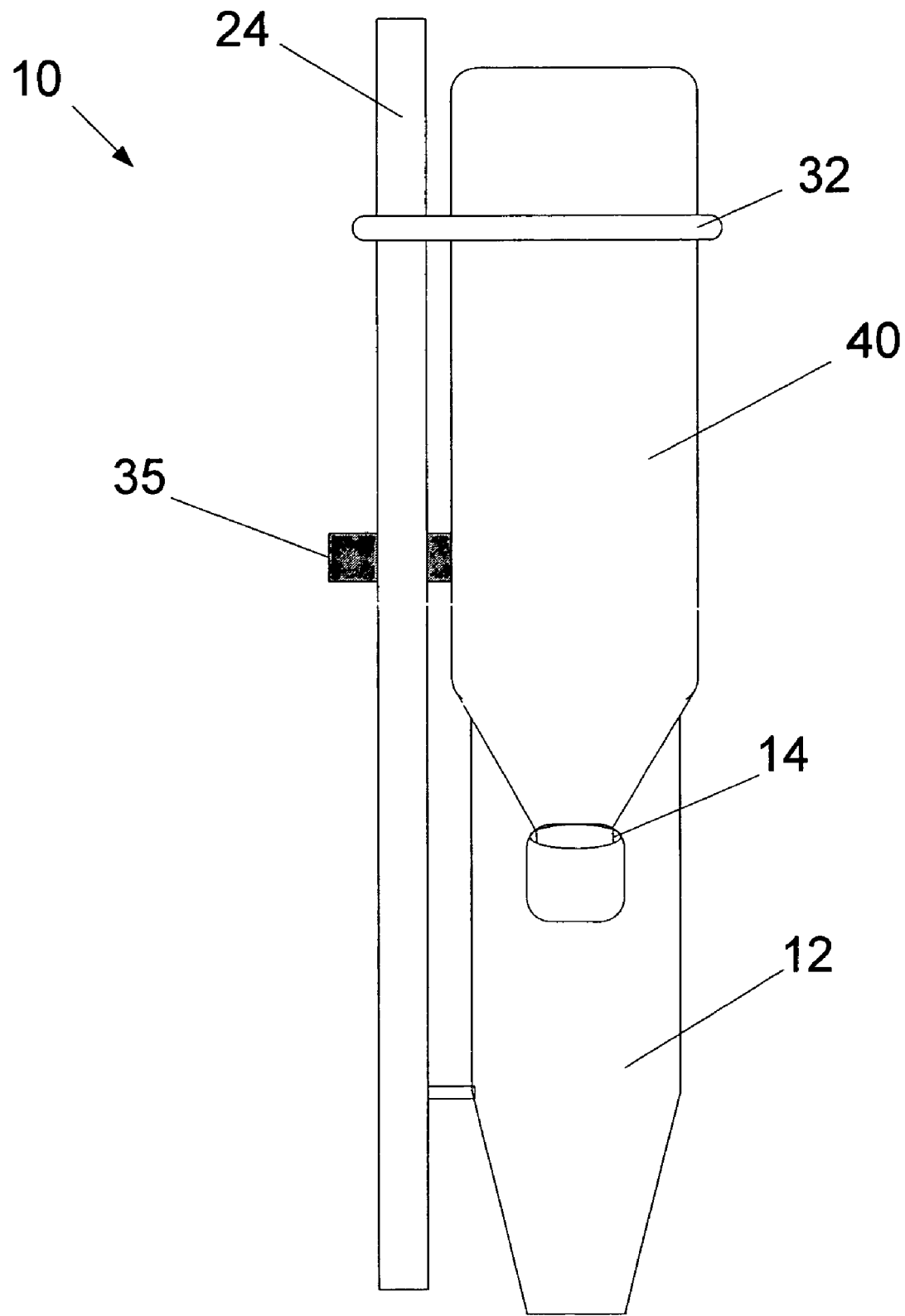
FIG. 3 is a schematic representation of the side view of the preferred embodiment.

Referring to FIG. 2, the support base 24 is preferably constructed of plastic sheet material. Other materials may be substituted. The base has an overall V-shape, convex at the bottom and concave at the top, with the bottom and top shapes being complementary. Therefore, if multiple units are to be stacked, the convex bottom of an upper unit nests in the concave top of the lower unit. This provides correct positioning and support for the upper unit, as well as spacing that allows the outlet 16 of the upper unit to fit snugly in the opening 27 of the lower unit.

The housing 12 may be welded to the support base by the process of sonic welding. Other means to join them may be used, such as gluing, clamping or the like. The support base 24 has support arms 32 protruding from one face. The support arms 32 together with the inlets 14 hold the plastic motor oil containers 40 in place within the inlet tapers and drainage shafts 30 to drain the residual oil from the motor oil containers 40. The support arms 32 may be straight or they may be L-shaped and may be constructed of plastic, wood, ceramic, metal, or other suitable material. The support base has a pair of mounting slots 33 which may be utilized to secure the assembly to a vertical support structure (not shown) such as a wall or post. The mounting slots are approximately 1½ inches long and ¼ inch wide and may receive a fastening means (not shown) to affix the assembly to the support structure. The mounting slots 33 are sized to permit up and down adjustment of the assembly 10 while attached to the support structure. The fastening means to the support structure may be screws, pegboard hooks, nails, hooks, picture hangers, and molly bolts, or other suitable devices.

Figure 4:
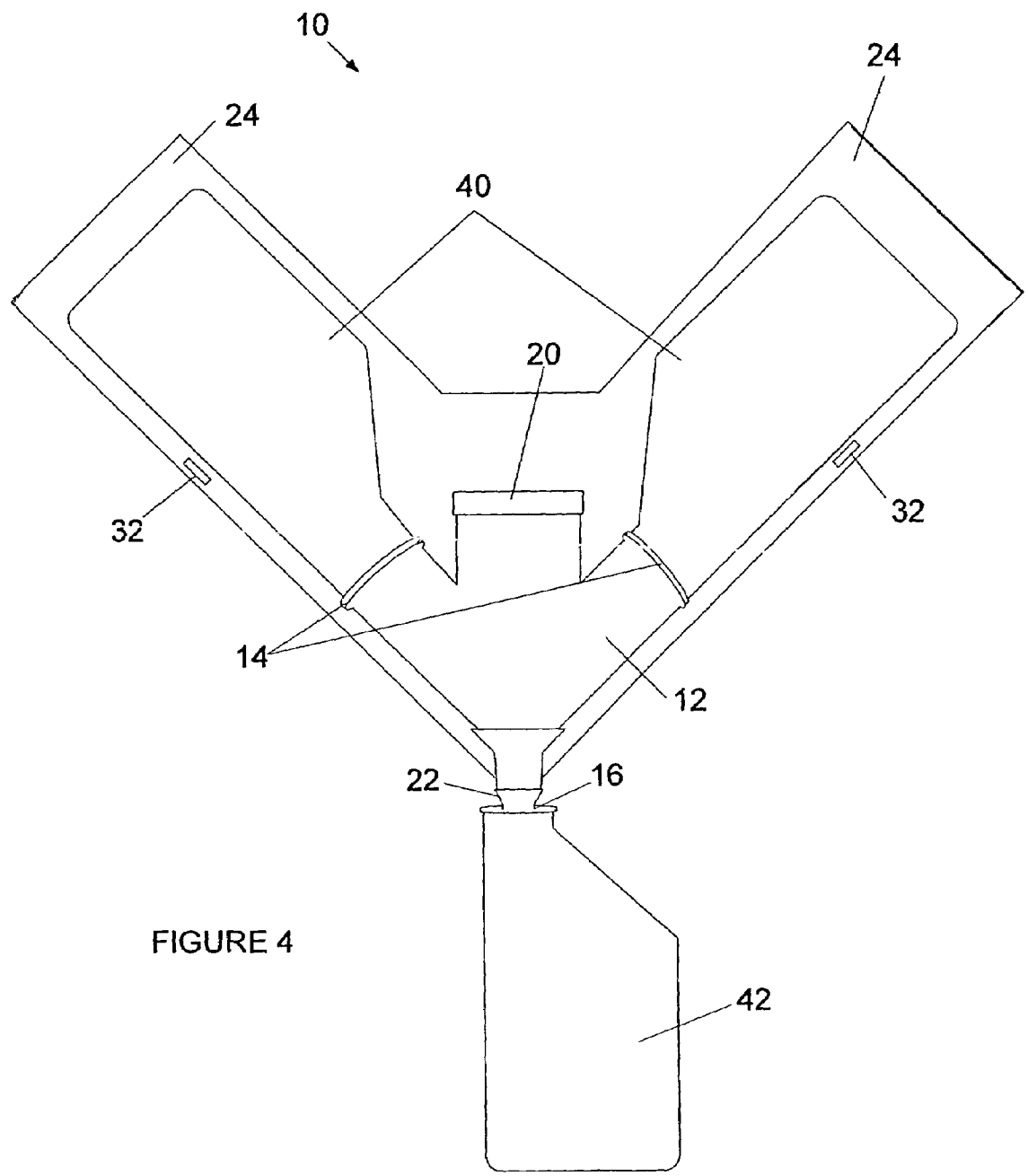
FIG. 4 is a schematic representation of the housing unit with oil bottles draining into an oil bottle.

FIG. 4 shows the assembly 10 with two motor oil containers 40 in place within the inlet drainage shaft 30, the removeable cap 20 in place on the main drainage shaft 30, and collection unit 42 in place at the bottom of the main drainage shaft 30. Drainage of the residual oil from the motor oil containers 40 is caused by the force of gravity. The taper 22 on the bottom of the main drainage shaft is sized so it fits snugly within the oil collection unit 42. When the main drainage shaft 26 has the cap 20 in place, the two motor oil containers 40 are securely in place within the inlet drainage shafts 30, and the taper on the bottom of the main drainage shaft 26 is securely in place within the oil collection unit 36, the system is substantially closed. Because the assembly is substantially closed, the residual oil from the motor oil containers 40 drain through the oil collection unit 36 to the collection unit 42 free of dust or other contaminants.

When assembly units 10 are stacked, the outlet 16 of an upper unit fits snugly in the opening 27 of the immediately lower unit, with only the top most opening closed by the cap 21. When an additional assembly is added the cap 21 on the lower assembly is removed to receive the tapered end 22 of the main drainage shaft 26 of the unit to be added.

Because this device permits a substantially closed system, the residual motor oil may be collected without dust or other contaminants getting into the oil collection unit 36. Because the motor oil so collected is dust free, it may be used for the same purpose as the oil was in the initial application. The device can save as much as a full quart of oil for every two cases of oil used. In addition, because the oil containers and are made of a plastic substance that does not absorb oil and in this configuration are completely drained, they are free of any oil residue and may be placed into landfill facilities without special handling.

Those of ordinary skill in the art will appreciate the units can be formed in a variety of configurations similar to that shown within the scope of the invention. For example, the housing 12 and base 24 can be formed as one piece, such as by injection molding.

Each additional assembly 10 stacked with another assembly permits an additional two motor oil containers 40 to be drained of residual oil.

What is claimed is:

1. A method for collecting dust and contaminant free residual motor oil comprising:
   attaching a first assembly having a plurality of inlets for collecting residual motor oil from plastic motor oil containers mounted to the inlets to a support structure;
   placing a lower outlet of the first assembly in a collection unit with a closed fit;
   placing a lower outlet of an additional assembly in an inlet of the first assembly;
   placing plastic motor oil containers in inlet drainage shafts of the first and additional assemblies; and
   collecting residual oil in the collection unit.

* * * * *